US011325026B2

(12) United States Patent
Mao

(10) Patent No.: US 11,325,026 B2
(45) Date of Patent: May 10, 2022

(54) MICRO GAME CONTROLLER

(71) Applicant: Dun Dun Mao, Burnaby, MI (US)

(72) Inventor: Dun Dun Mao, Burnaby, MI (US)

( * ) Notice: Subject to any disclaimer, the term of this patent is extended or adjusted under 35 U.S.C. 154(b) by 67 days.

(21) Appl. No.: 16/867,239

(22) Filed: May 5, 2020

(65) Prior Publication Data

US 2020/0353351 A1 Nov. 12, 2020

Related U.S. Application Data

(60) Provisional application No. 62/844,580, filed on May 7, 2019.

(51) Int. Cl.
*A63F 13/24* (2014.01)
*A63F 13/92* (2014.01)
*A63F 13/235* (2014.01)

(52) U.S. Cl.
CPC ............ *A63F 13/24* (2014.09); *A63F 13/235* (2014.09); *A63F 13/92* (2014.09)

(58) Field of Classification Search
CPC ........ A63F 13/24; A63F 13/92; A63F 13/235; A63F 13/98
See application file for complete search history.

(56) References Cited

U.S. PATENT DOCUMENTS

| 2015/0174482 | A1* | 6/2015 | Hirshberg | A63F 13/98 463/37 |
|---|---|---|---|---|
| 2017/0056762 | A1* | 3/2017 | Gafni | A63F 13/24 |
| 2019/0379231 | A1* | 12/2019 | Gonzalez | A63F 13/24 |
| 2020/0282309 | A1* | 9/2020 | Liao | A63F 13/24 |
| 2021/0104907 | A1* | 4/2021 | Chen | H02J 50/10 |
| 2021/0205699 | A1* | 7/2021 | Chung | A63F 13/98 |

* cited by examiner

*Primary Examiner* — James S. McClellan
*Assistant Examiner* — Peter J Iannuzzi

(57) ABSTRACT

A portable micro controller for interacting with video games executed on a mobile device such as a smartphone or tablet computer is disclosed. The portable micro controller includes a plurality of interface elements common to video game controllers. The interface elements are ergonomically located on multiple surfaces of a controller housing. The controller housing further includes a retractable support arm for securing a video game device to the controller.

17 Claims, 4 Drawing Sheets

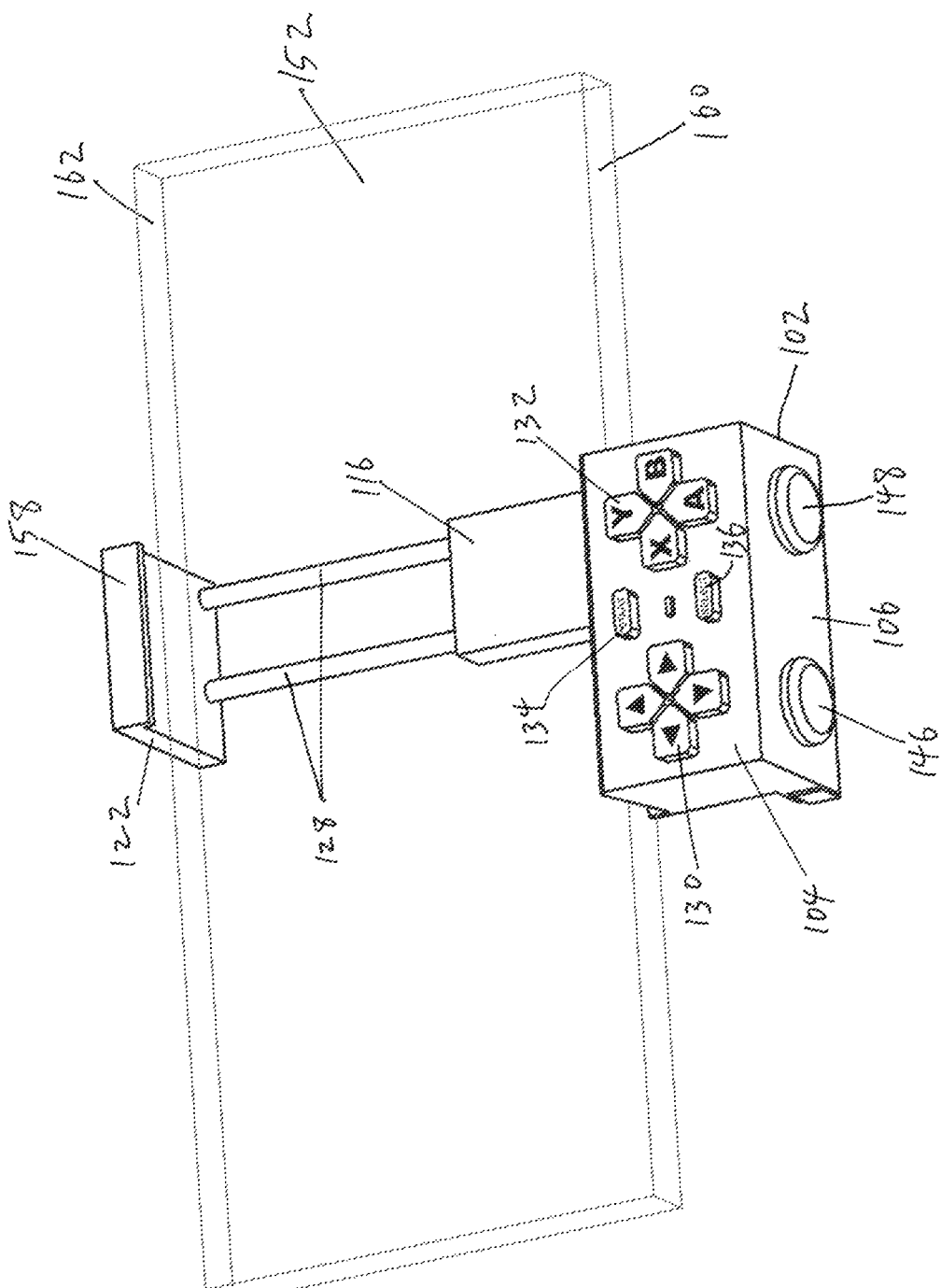

MICRO GAME CONTROLLER

BACKGROUND

Gaming on smartphones and tablet computers has gained in popularity with the growing ubiquity of such devices. Interface devices, however, have not kept pace with the unique demands of gaming on such platforms. A game controller providing an interface for controlling games on portable video game devices such as smartphones or tablet computers must be portable and compact, yet must also provide easy and comfortable access to the myriad input elements common to most game controllers. In addition, controllers for controlling games on such devices must provide a convenient mechanism allowing users to hold both the portable video game device and the controller in a manner that allows users to view the game activity occurring on the video game device display while simultaneously interacting with the various interface elements of the controller. A fully functional game controller that meets these requirements will undoubtedly enhance the user experience of gamers interacting with such mobile game platforms.

SUMMARY OF THE INVENTION

The present invention relates to a portable micro game controller for controlling a video game executed on a video game device, such as a smartphone a tablet computer, or the like. According to an embodiment of the invention a portable micro game controller includes a rectangular cube shaped housing. A plurality of interface elements including rocker switches, pushbuttons, and analog joysticks are located on multiple surfaces of the housing. A retractable support arm is pivotably attached to the housing and rotates between a stowed position and a support position. According to an embodiment, a clip plate is mounted on the distal end of a pair of extension rods associated with the support arm. The clip plate cooperates with a video game device cradle to secure a video game device to the game controller. The clip plate, retractable support arm and/or retractable extension rod are off-center of the housing when in use to secure the video game device.

According to another embodiment, a game controller comprises a retractable support arm attached to a housing. The retractable support arm is configured to secure a video game device to the housing. A first plurality of interface elements is located on a front surface of the housing; a second plurality of interface elements is located on a rear surface of the housing; and a third plurality of interface elements is located on a bottom surface of the housing. A communications module is housed within the housing. The communication module is adapted to communicate interface signals associated with the various interface elements to the video game device.

According to yet another embodiment, a video game controller includes a housing having interface elements located on a front side of the housing, a back side of the housing, and a bottom side of the housing. A device cradle is formed along a top side of the housing. The video game controller further includes a retractable support arm pivotably attached to the back side of the housing. The support arm includes a pair of retractable extension rods. A clip structure is mounted on a distal end of the extension rods which is configured to secure a horizontally oriented smartphone between the clip structure and the device cradle. The game controller further includes a communication module for communicating video game control signals derived from the interface elements to the smartphone.

BRIEF DESCRIPTION OF THE DRAWINGS

FIG. 4 is a perspective view of the front of a micro game controller according to an embodiment of the invention, with a retractable support arm securing a video game device to the controller.

DETAILED DESCRIPTION

Figure 1:
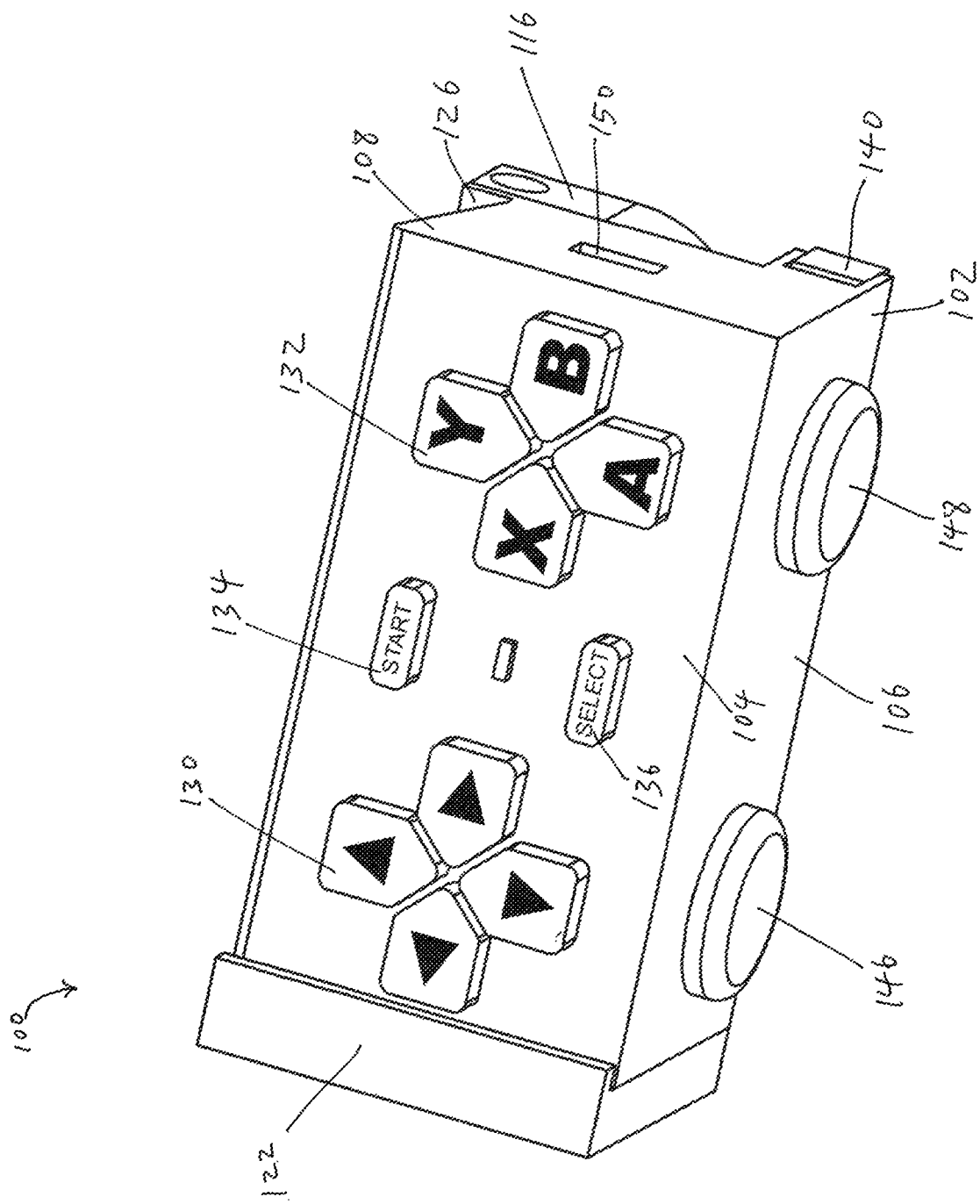
FIG. 1 is a perspective view showing the front, bottom and right sides of a micro game controller according to an embodiment of the invention.
Figure 2:
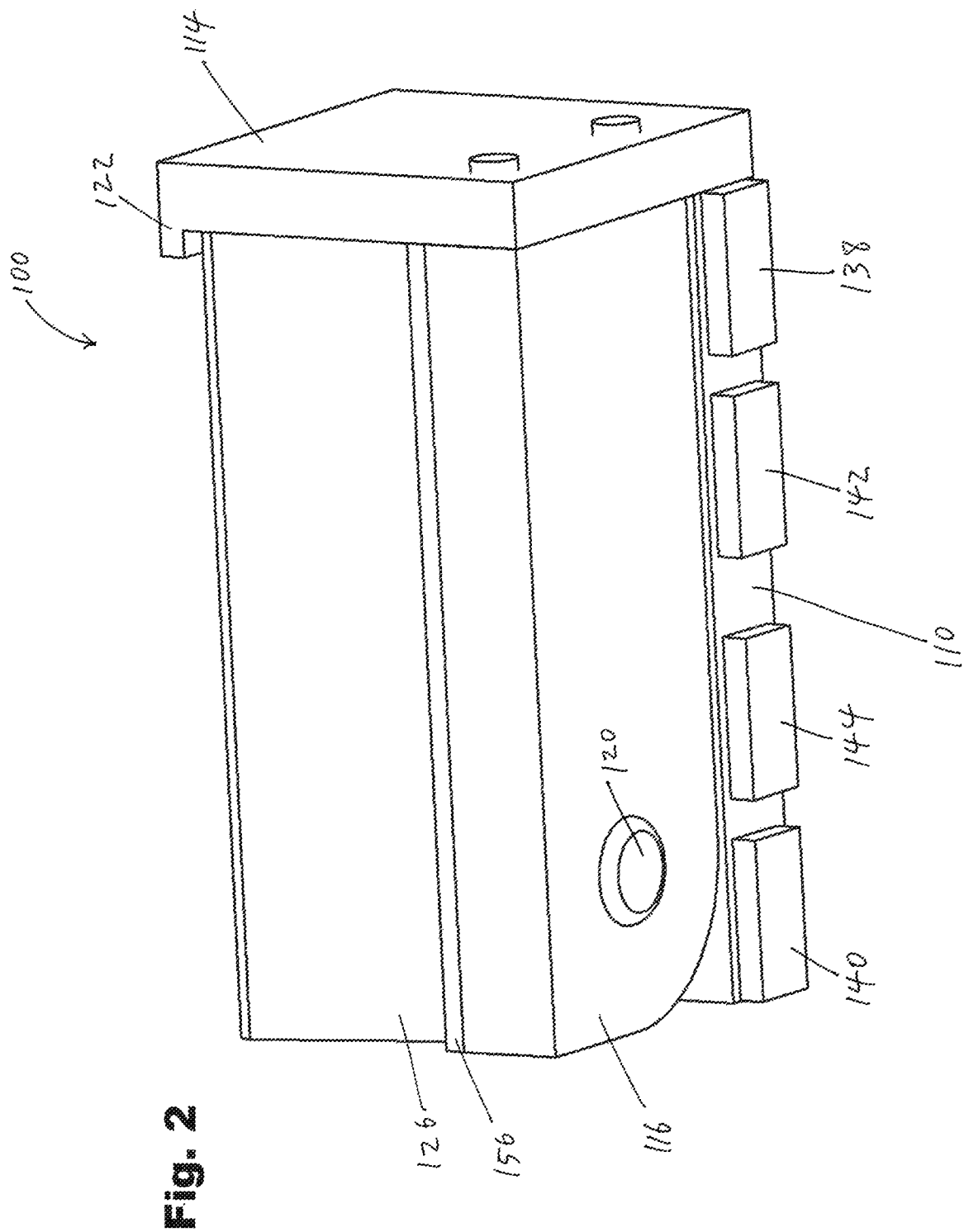
FIG. 2 is a perspective view showing the back top and left sides of a micro game controller according to an embodiment of the invention.

The present invention relates to a portable gaming controller for controlling the operation of a video game executed on a video game device such as a smartphone or a tablet computer. Turning first to FIGS. 1 and 2, an embodiment of a game controller 100 has a main body in the form of a rectangular housing 102. A front side 104, a bottom side 106, and a right side 108 of the housing 102 can be seen in the perspective view of FIG. 1. A back side 110, a top side 112, and a left side of the housing 102 are shown in the perspective view of FIG. 2.

An array of gaming interface elements are ergonomically arrayed on the various surfaces of the housing 102. For example, in the embodiment illustrated in FIGS. 1 and 2, first and second four position rocker switches 130, 132 are located near the left and right ends of the front side 104 of the housing 102. The first rocker switch 130 may correspond to left/right/up/down signals for controlling the movement of an avatar or sprite in a virtual game space as is common in many video games. The second rocker switch 132 may correspond to X/Y/A/B input signals, which again are common inputs for many video games. The front surface 104 also includes a START pushbutton 134 and a SELECT pushbutton 136 located near the top of the front surface 104 between the two rocker switches 130, 132. A left analog joystick 146 and a right analog joystick 148 extend from the bottom surface 106 of the housing 102. Finally, a plurality of pushbuttons 138, 140, 142, 144 are arrayed across the bottom edge of the back surface 110 of the housing 102. The back side buttons may correspond to a left BUMPER button 138, a left TRIGGER button 142, a right BUMPER button 140 and a right TRIGGER button 144.

The housing 102 encloses an electronic circuit board for converting tactile input received from a user via the various interface elements into electronic signals that may be used to control a video game executed on a video game device. The control signals may be communicated from the controller to the video game device via a hard wired connection, such as through an optional USB port 150. Alternatively, the housing may enclose a wireless communication module that allows the micro controller to communicate with the video device via a wireless communication protocol such as Bluetooth, wi-fi, or the like.

Figure 3:
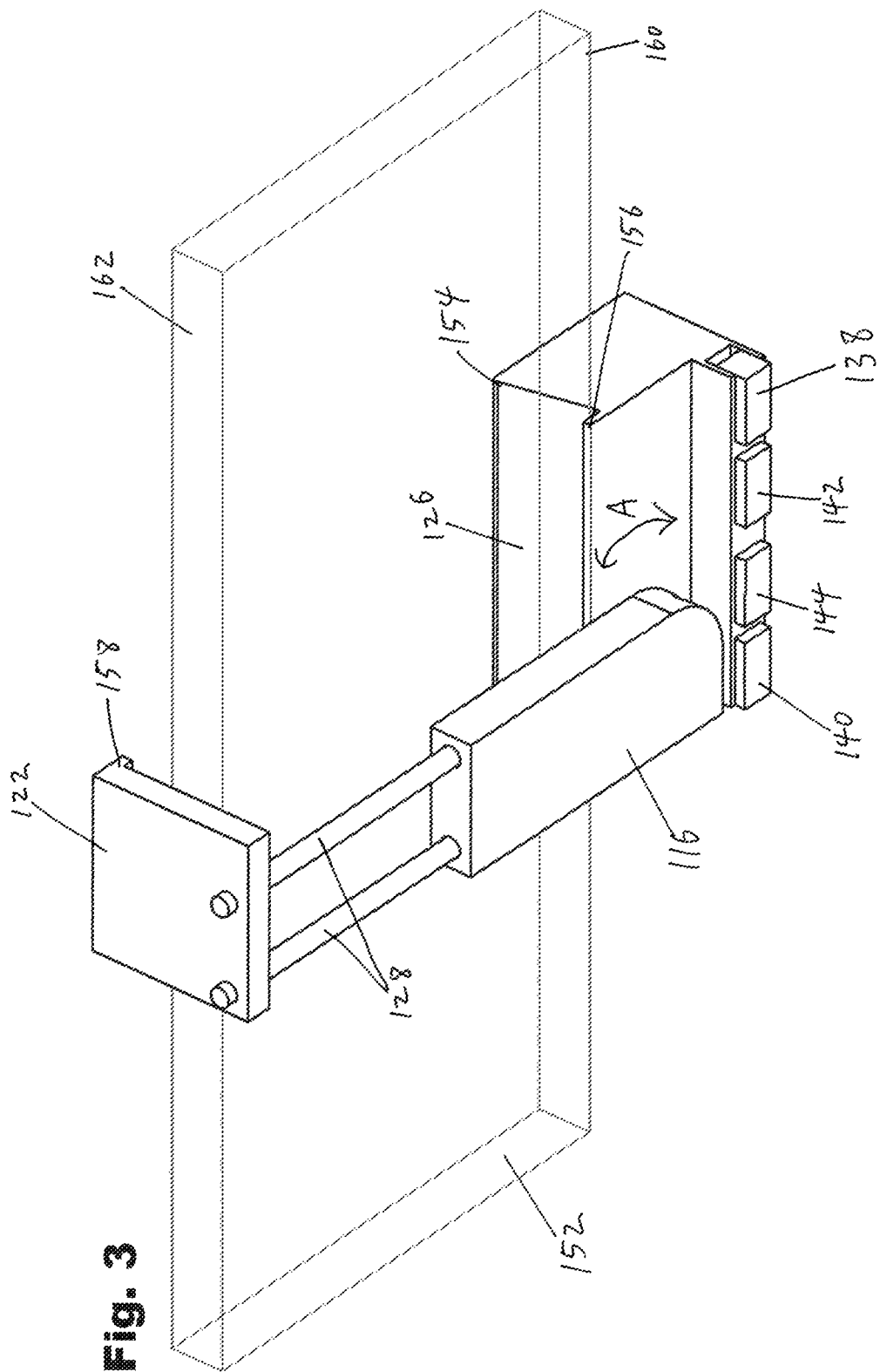
FIG. 3 is a perspective view of the back of a micro game controller according to an embodiment of the invention, with a retractable support arm securing a video game device to the controller.

Turning now to FIGS. 3 and 4, the game controller 100 includes a retractable support arm 116 for securing a video game device such as a smart phone or a tablet computer to the housing 102. The extendable support arm 116 is pivotably secured to the back side 110 of the housing 102 by a pivot pin 120. The pivot pin 120 allows the support arm 116 to be manually rotated 90° relative to the housing 102 between a first stowed position and a second in-use position, as indicated by the double headed arrow A in FIG. 3. FIGS. 3 and 4 show the support arm rotated into the in-use position while, FIGS. 1 and 2 show the housing 102 with the support arm 116 in the stowed position. A clip plate 122 is attached to the distal end of a pair of retractable extension rods 128 associated with the support arm 116. In the stowed position the extension rods 128 may be pushed into the support arm 116 so that the clip plate 122 abuts the left side 114 of the housing 102 as shown in FIGS. 1 and 2. When in use, the clip plate 122 may be pulled out from the support arm 116 and the extension rods 128 extended as shown in FIGS. 3 and 4.

When in use, the clip plate 122 cooperates with a ridge or cradle 126 formed along the upper side 112 of the housing 102 to secure a video game device such as a smartphone or tablet computer to the housing 102. The device cradle 126 comprises a depression formed in the top surface 112 of the housing 102 which defines a front cradle ridge 154 and a rear cradle ridge 156. A first longitudinal side 160 of the video game device 152 may be inserted into the cradle 126 and held in place by the front and back cradle ridges 154, 156. The clip plate 122 includes a short lip 158 across its leading edge. A second longitudinal side 162 of the video game device may 152 be wedged behind the lip 158 so that the clip plate 122 secures the second longitudinal edge of the video game device to the game controller 100.

With the video game device installed in this manner, a user may view the display screen on the front of the video game device 152 while manipulating the interface elements with the various fingers of each hand. For example, the various positions of the up/down/left/right rocker switch 130 and the START pushbutton 134 may be engaged by the user's left thumb, and the X/Y/A/B rocker switch 132 and the SELECT pushbutton 136 may be engaged by the user's right thumb. The left and right analog joysticks 146, 148 are mounted at a steep angle along the lower side 106 of the housing 102 so that these too may be operated by the user's left and right thumbs, respectively. Finally, the left BUMPER pushbutton 138 and the left TRIGGER pushbutton 142 may be engaged by either the middle finger or ring finger of the user's left hand, and the right BUMPER pushbutton 140 and the right TRIGGER pushbutton may be engaged by the middle finger or ring finger of the user's right hand.

Various embodiments of the invention have been described and illustrated; however, the description and illustrations are by way of example only. Other embodiments and implementations are possible within the scope of the invention and will be apparent to those of ordinary skill in the art. Therefore, the invention is not limited to the specific details of the representative embodiments and illustrated examples in this description. Accordingly, the invention is not to be restricted except as necessitated by the accompanying claims and their equivalents.

What is claimed is:

1. A game controller for controlling a video game executed on a video game device, the game controller comprising:
   a housing having a front surface and a back surface;
   an interface element on the front surface;
   a pivot pin perpendicular to the back surface; and
   a retractable support arm adapted to secure the video game device to the housing, wherein the retractable support arm is pivotably secured to the back surface by the pivot pin, such that the retractable support arm may be manually rotated between a stowed position and an in-use position and wherein the retractable support arm includes a retractable extension rod.

2. The game controller of claim 1 wherein the video game device comprises a smart phone or a tablet computer.

3. The game controller of claim 1 further comprising a clip plate mounted on a distal end of the retractable extension rod, and a cradle formed on a top surface of the housing, the clip plate cooperating with the cradle to secure the video game device to the game controller.

4. The game controller of claim 1 wherein the interface element is a four-position rocker switch and the game controller comprises a trigger button and a bumper button located on a bottom edge of the back surface.

5. The game controller of claim 4 comprising:
   a second four-position rocker switch, a START button and a SELECT button on the front surface;
   first and second TRIGGER buttons and first and second BUMPER buttons on a bottom edge of the back surface; and
   first and second analog joysticks mounted on a bottom surface of the housing.

6. The game controller of claim 1 comprising an analog joystick mounted on a bottom surface of the housing.

7. The game controller of claim 1, wherein the retractable support arm is off-center of the housing in its in-use position.

8. A game controller comprising:
   a housing having a front surface and a back surface;
   a retractable support arm attached to the housing and rotatable about an axis that is perpendicular to the back surface, the retractable support arm configured to secure a video game device to the housing;
   a first plurality of interface elements located on the front surface;
   a second plurality of interface elements located on the back surface; and
   electronic circuitry within the housing adapted to communicate interface signals associated with the interface elements to the video game device the game controller further comprising a pivot pin that secures the retractable support arm to the housing and a retractable extension rod for extending a length of the retractable support arm.

9. The game controller of claim 8 further comprising a third plurality of interface elements located on a bottom surface of the housing.

10. The game controller of claim 9 wherein the first plurality of interface elements includes at least one four-position rocker switch and at least one pushbutton, the second plurality of interface elements includes at least two pushbuttons, and the third plurality of interface elements includes at least one analog joystick.

11. The game controller of claim 8 wherein the video game device comprises one of a smart phone and a tablet computer.

12. The game controller of claim 8 wherein the electronic circuitry communicates the interface signals via a Bluetooth protocol, a Wi-Fi protocol, or a universal serial bus.

13. The game controller of claim 8 further comprising:
   a clip plate attached to a distal end of the retractable extension rod, the clip plate including a structure for securing a first side of the video game device, wherein the clip plate and retractable extension rod are off-center of the housing when securing the video game device; and a cradle on a top surface of the housing for holding a second, opposing side of the video game device.

14. The game controller of claim 8 wherein the interface elements on the back surface are along a bottom edge of the back surface.

15. A video game controller comprising:
a housing having interface elements located on a front side of the housing, a back side of the housing, and a bottom side of the housing, and a device cradle formed along a top side of the housing;
a retractable support arm pivotably attached to the back side of the housing via a pin that is perpendicular to the back surface, the retractable support arm including a retractable extension rod and a clip structure mounted on a distal end of the extension rod, the clip structure configured to secure a horizontally oriented smartphone between the clip structure and the device cradle;
and electronic circuitry for communicating video game control signals derived from the interface elements located on the front, the back and the bottom sides of the housing to the smartphone.

16. The video game controller of claim 15 wherein the interface elements include a four-position rocker switch, a pushbutton, and an analog joystick.

17. The video game controller of claim 15 wherein the interface elements on the back side are along a bottom edge of the back side.

* * * * *

UNITED STATES PATENT AND TRADEMARK OFFICE
CERTIFICATE OF CORRECTION

PATENT NO. : 11,325,026 B2
APPLICATION NO. : 16/867239
DATED : May 10, 2022
INVENTOR(S) : Mao

It is certified that error appears in the above-identified patent and that said Letters Patent is hereby corrected as shown below:

In the Claims

Column 4 Line 21 Claim 5, the word 'a' should read --the--.
Column 5 Line 13 Claim 15, the word 'surface' should read --side--.

Signed and Sealed this
Twenty-eighth Day of June, 2022

Katherine Kelly Vidal
*Director of the United States Patent and Trademark Office*